Nov. 23, 1965     A. J. CARPENTER     3,219,775
BRAKE PEDAL SWITCH ACTUATING MECHANISM
Filed April 12, 1963
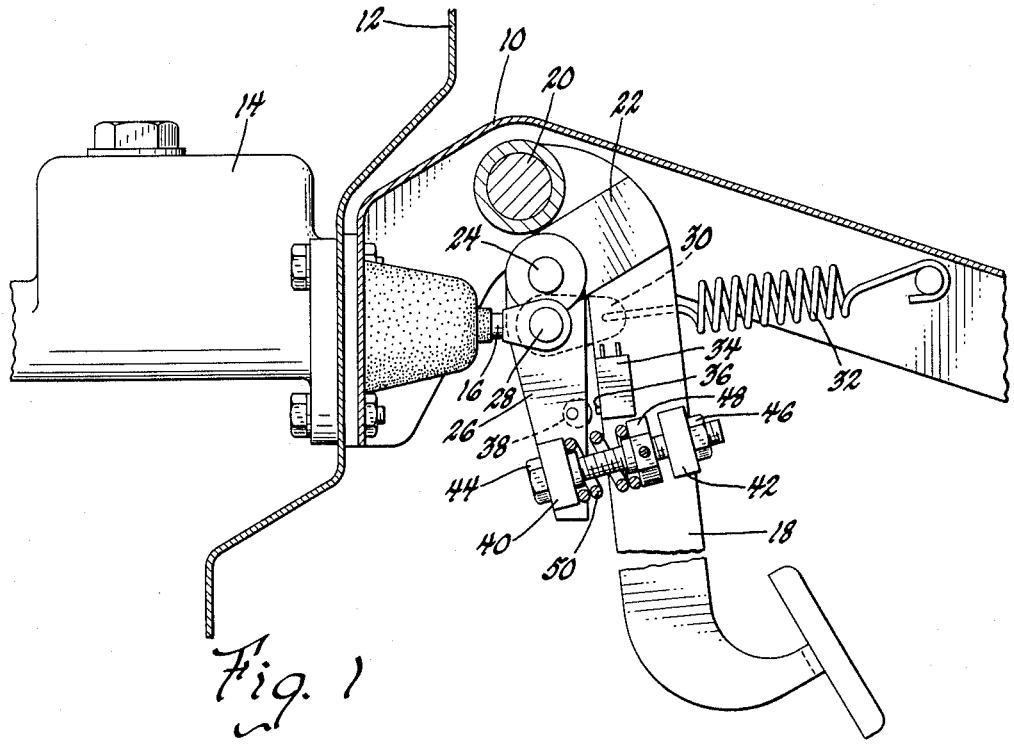
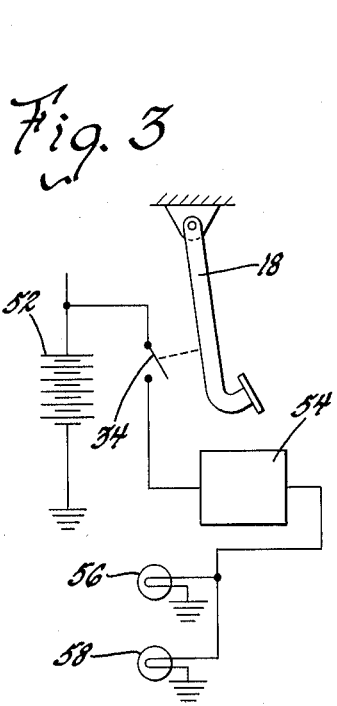
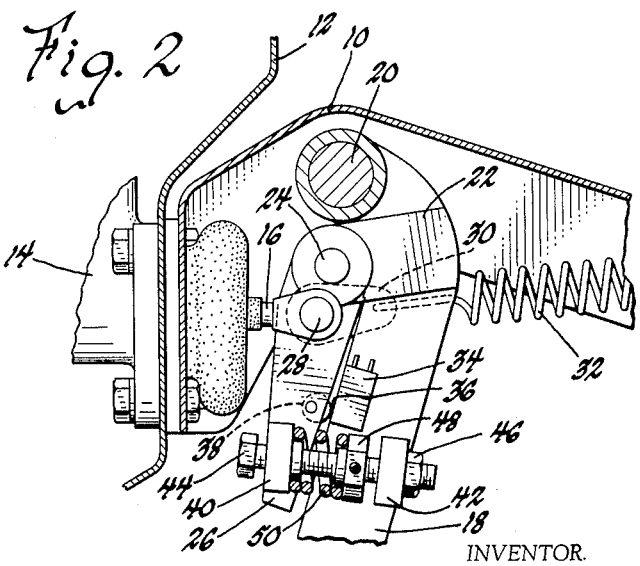
INVENTOR.
Arthur J. Carpenter
BY C. R. Meland
HIS ATTORNEY 3,219,775
BRAKE PEDAL SWITCH ACTUATING
MECHANISM
Arthur J. Carpenter, Royal Oak, Mich., assignor to General Motors Corporation, Detroit, Mich., a corporation of Delaware
Filed Apr. 12, 1963, Ser. No. 272,583
8 Claims. (Cl. 200—61.89)

This invention relates to a brake pedal switch actuating mechanism and more particularly to a brake pedal switch actuating mechanism wherein the switch is closed only when the brake pedal is suddenly depressed as in a panic stop.

It is well known in the art to actuate a stop light switch in accordance with the movement of a brake pedal. These switches have taken various forms and can be operated hydraulically by compression of brake fluid or can be actuated directly by engagement with the brake pedal or by engagement by a part that moves with the brake pedal. In these switch actuating arrangements, the stop light switch is closed whenever the brake pedal is depressed a predetermined distance to indicate to a following driver that the brakes are being applied.

When a driver is following a vehicle which has its rear stop lights turned on due to the depression of the brake pedal, the driver is warned that the vehicle he is following is either slowing down or coming to a sudden stop. This indication does not discriminate between these two conditions, however, and where the vehicle is making a sudden panic stop, the following driver may take the stop light indication as only meaning that the motor vehicle he is following is slowing down rather than making a sudden panic stop. In high speed turnpike driving, this can be a dangerous situation since where the driver makes a sudden stop, a rear end collision may occur where the following driver takes the stop light indication as only meaning that the car he is following is slowing down.

It accordingly is an object of this invention to provide a brake pedal switch actuating mechanism wherein the switch is only closed whenever the brake pedal is depressed with a force which is greater than that ordinarily applied by the driver as where the driver is making a panic stop. In the use of this mechanism, the vehicle may be provided with two sets of stop lights, one of which operates in the conventional manner and the other of which is only energized when the driver is making a sudden panic stop. Thus in carrying forward the objects of this invention, the vehicle may be provided with an extra pair of tail lights or filaments which hereinafter will be referred to as panic stop lamps.

Another object of this invention is to provide a switch actuating mechanism wherein a switch is carried by a brake pedal and wherein the actuating button of the switch is only depressed when the brake pedal is moved by a greater than ordinary force as when making a panic stop.

Still another object of this invention is to provide a brake pedal operated switch actuating mechanism wherein the switch is carried by the brake pedal and wherein an extra link is provided that moves toward the brake pedal and causes an actuation of the switch only when the brake pedal is depressed with a predetermined amount of force. In carrying this object forward, the brake pedal and link are connected by an adjustable mechanism which is capable of adjusting the distance required to actuate the switch. In addition, this mechanism is provided with a compression spring which determines the amount of force required to actuate the switch and means are provided to adjust the compression of this spring to adjust the amount of force required to close the switch.

Further objects and advantages of the present invention will be apparent from the following description, reference being had to the accompanying drawings wherein preferred embodiments of the present invention are clearly shown.

In the drawings:

FIGURE 1 is a plan view of a brake pedal switch actuating mechanism made in accordance with this invention.

FIGURE 2 is a view similar to FIGURE 1 but illustrating the brake pedal shifted to a position wherein the panic stop light switch is closed.

FIGURE 3 is a schematic circuit diagram of a panic stop light system made in accordance with this invention which uses the brake pedal switch actuating mechanism of this invention.

Referring now to the drawings and more particularly to FIGURE 1, the reference numerals 10 and 12 designate fixed metal supports. The support 12, which may be the firewall of a motor vehicle, supports a conventional master cylinder designated by reference numeral 14 which contains hydraulic fluid that is compressed to actuate the brakes of a motor vehicle when the rod member 16 is moved longitudinally. It will of course, be appreciated that the master cylinder 14 will have a piston that can be operated mechanically by a brake pedal or could be of the power booster type wherein a vacuum assist is provided.

The brake pedal is designated by reference numeral 18 and this pedal is pivoted to a pin 20 which is fixed to the support 10. The brake pedal carries a bracket 22 and this bracket supports a pivot pin 24. An actuator link 26 is provided which is pivotally supported by the pin 24.

The actuator link 26 carries a pin 28 which is pivotally connected with the actauting rod 16 of the master cylinder. The pin 28 is also pivotally connected to a link 30 and this link is connected with a spring 32 which returns the brake pedal 18 to the FIGURE 1 position after it is released.

The brake pedal 18 carries an electric switch 34 which has a switch actuating button 36. This switch is of a type which requires very little movement of the switch actuating button 36 to move it to a closed position. The switch 34 contains a spring or other device which normally maintains this switch in an open position. It is seen that the actuator link 26 carries a part 38 which at times becomes engaged with the switch actuating button 36 to close the switch 34.

The actuator link 26 carries a lug 40 which is welded or otherwise secured thereto. In a similar manner, the brake pedal 18 carries a lug 42. A threaded bolt 44 passes through the lug 40 and is threaded into the lug 42. The arrangement is such that the bolt 44 can move relative to the lug 40 but cannot move relative to the lug 42 since it is threaded into this lug. The bolt is held in place relative to the lug 42 by a nut 46.

The bolt 44 carries a spring retainer and adjusting nut 48 which is threaded onto the bolt 44. A compression spring 50 is interposed between the lug 40 and the adjusting nut 48. The adjusting nut 48 can be provided with a set screw if desired to hold it in place once it has been adjusted along the length of the bolt 44 to adjust the force of the spring 50.

It will be appreciated from the foregoing that when the brake pedal 18 is depressed in the normal manner, the brake pedal pivots around the pivot 20 and causes the actuator link 26 to move clockwise in FIGURE 1. This applies the brakes in the normal manner but since there has not been a force application of sufficient magnitude to overcome spring 50, the switch 34 is not actuated and the actuator link 26 follows the movement of the brake pedal 18.

If the brake pedal 18 is suddenly and forcefully moved clockwise as when making a sudden panic stop, the force is such that the spring 50 is overcome and the actuator link 26 and the pedal 18 move toward each other a sufficient distance to cause the switch 34 to be actuated to a closed position. During this movement of the brake pedal 18, the rod 16 and the pivot 28, a reactive force from the master cylinder occurs which slows down and eventually stops movement of link 26 except for possible pivotal movement of the link around pivot 28. When this occurs and the force applied to the brake pedal is sufficient, the spring 50 is overcome and the switch 34 is closed. The panic stop position is depicted in FIGURE 2 wherein the part 38 has engaged the switch actuating button 36 to close the switch 34. The length of movement which is required to close the switch 34 can be adjusted by adjusting the bolt 44 relative to the lug 42. The force required to close switch 34 can be adjusted by adjusting the nut 48 relative to the lug 40.

It can be seen from the foregoing, that the switch 34 will never be actuated during normal force applications to the brake 18 since during these normal force applications, the force of spring 50 is not overcome to cause the part 38 to engage the part 36 of the switch 34. On the other hand, during a sudden panic stop, the switch 34 will be actuated to a closed position since the force of spring 50 will be overcome by the greater than ordinary force application.

It should be pointed out that a conventional stop light switch could be provided in addition to the switch 34 for energizing the stop lights in a conventional manner when the brake pedal 18 is depressed in its normal manner.

Referring now to FIGURE 3, a schematic circuit diagram is illustrated for energizing panic stop lights. In this diagram, the reference numeral 52 designates the source of direct current on a motor vehicle. One side of this source is grounded whereas the opposite side of this source is connected with the brake pedal actuated switch 34. The opposite side of the switch 34 is connected to a control mechanism 54. This control mechanism may include a flasher or circuit interrupter for feeding the rear mounted panic stop lights 56 and 58. In this system, the switch 34 is closed for a period of time corresponding to the force application to the brake pedal 18 of greater than a predetermined magnitude at which time the panic stop lamps 56 and 58 are energized. The flasher means is not illustrated since this device is well known to those skilled in the art and could take a wide variety of forms. Its use is also optional since the switch 34 can control any desired type of electrical signalling system.

While the embodiments of the present invention as herein disclosed, constitute a preferred form, it is to be understood that other forms might be adopted.

What is claimed is as follows:

1. In combination, a brake actuating mechanism including shiftable brake actuating means, a pivotally mounted brake pedal, a switch actuator link, means pivotally connecting said switch actuator link with said brake actuating means and with said brake pedal, a switch having an actuating means carried by said brake pedal, said switch actuating means being aligned with means carried by said switch actuator link whereby said switch is closed under certain conditions of operation, and a compression spring interposed between said brake pedal and said actuator link, said switch being actuated only when the force of said compression spring is overcome by a sufficient application of braking effort to said brake pedal.

2. In combination, a brake actuating means including a shiftable rod member, a pivotally mounted brake pedal, a switch actuating link, means pivotally connecting one end of said switch actuating link to said brake pedal, means pivotally connecting said switch actuating link to said rod member at a point intermediate the ends of said switch actuating link, resilient means interposed between the opposite end of said switch actuating link and said brake pedal, and an electric switch carried by said brake pedal which is actuated by said switch actuating link when a force is applied to said brake pedal of sufficient magnitude to overcome the force of said resilient means.

3. The combination according to claim 2 wherein means are provided for adjusting the compression of said resilient means.

4. The combination according to claim 2 wherein means are provided for adjusting the distance between the actuator link and the brake pedal.

5. In combination, a brake actuating mechanism actuated by the shiftable movement of a rod means, a pivotally mounted brake pedal, an actuator link one end of which is pivotally connected to said brake pedal, means pivotally connecting said rod member with said actuator link at a point intermediate its ends, resilient means interposed between the opposite end of said actuating link and said brake pedal, and an electric switch operated by the movement of said actuating link when the force of said spring is overcome by a predetermined force applied to said brake pedal.

6. In combination, a brake actuating mechanism operated by shiftable movement of a rod member, a pivotally mounted brake pedal, a switch actuating link, one end of said switch actuating link being pivotally connected to said brake pedal, means pivotally connecting said switch actuating link and said rod member, a first lug means carried by said switch actuating link, a second lug means carried by said brake pedal, a threaded member passing through said first lug means and threaded into said second lug means, said threaded member being shiftable relative to said first lug means, a nut means threaded on to said threaded member located between said first and second lug means, a compression spring interposed between said first lug means and said nut means, and a switch carried by said brake pedal which is actuated by relative movement of said switch actuating link and said brake pedal when the force of said spring is overcome by a force application applied to said brake pedal.

7. A switch actuating mechanism comprising, a first lever, means pivotally connecting said first lever to a fixed support, a second lever pivotally connected to said first lever, a device to be actuated connected with said second level and operable to apply a reactive force to said second lever when said first and second levers are moved together, a resilient means interposed between said first and second levers for maintaining said levers spaced apart when said first lever moves said second lever, and an electric switch carried by one of said levers, said switch being operated by said other lever only when said levers move toward each other a predetermined amount when said resilient means is overcome by a predetermined force applied to said first lever.

8. A switch actuating arrangement comprising, a lever, means pivotally supporting said lever, a switch actuating link, means pivotally connecting one end of said switch actuating link to said lever, means pivotally connecting said switch actuating link to a device to be actuated at a point intermediate the ends of said switch actuating link, resilient means interposed between said switch actuating link and said lever, and an electric switch actuated by movement of said lever and switch actuating link toward each other when a force is applied to said lever of sufficient magnitude to overcome the force of said resilient means.

References Cited by the Examiner

UNITED STATES PATENTS

| | | | |
|---|---|---|---|
| 1,676,412 | 7/1928 | Pervier | 200—61.89 |
| 2,828,379 | 3/1958 | Simonds et al. | 200—86.5 |
| 3,013,143 | 12/1961 | Hayden | 200—153.8 |
| 3,086,093 | 4/1963 | Barker | 200—86.5 |
| 3,163,735 | 12/1964 | Miller | 200—153.8 |

OTHER REFERENCES 1,077,547 3/1960 Weichs (German printed application).

BERNARD A. GILHEANY, *Primary Examiner.*

ROBERT K. SCHAEFER, *Examiner.*